June 4, 1929.                    F. L. ORR                    1,715,778
                        VARIABLE SPEED TRANSMISSION
                         Filed March 26, 1927          4 Sheets-Sheet 1

INVENTOR.
Francis L. Orr
BY
ATTORNEY.

June 4, 1929.  F. L. ORR  1,715,778
VARIABLE SPEED TRANSMISSION
Filed March 26, 1927  4 Sheets-Sheet 2
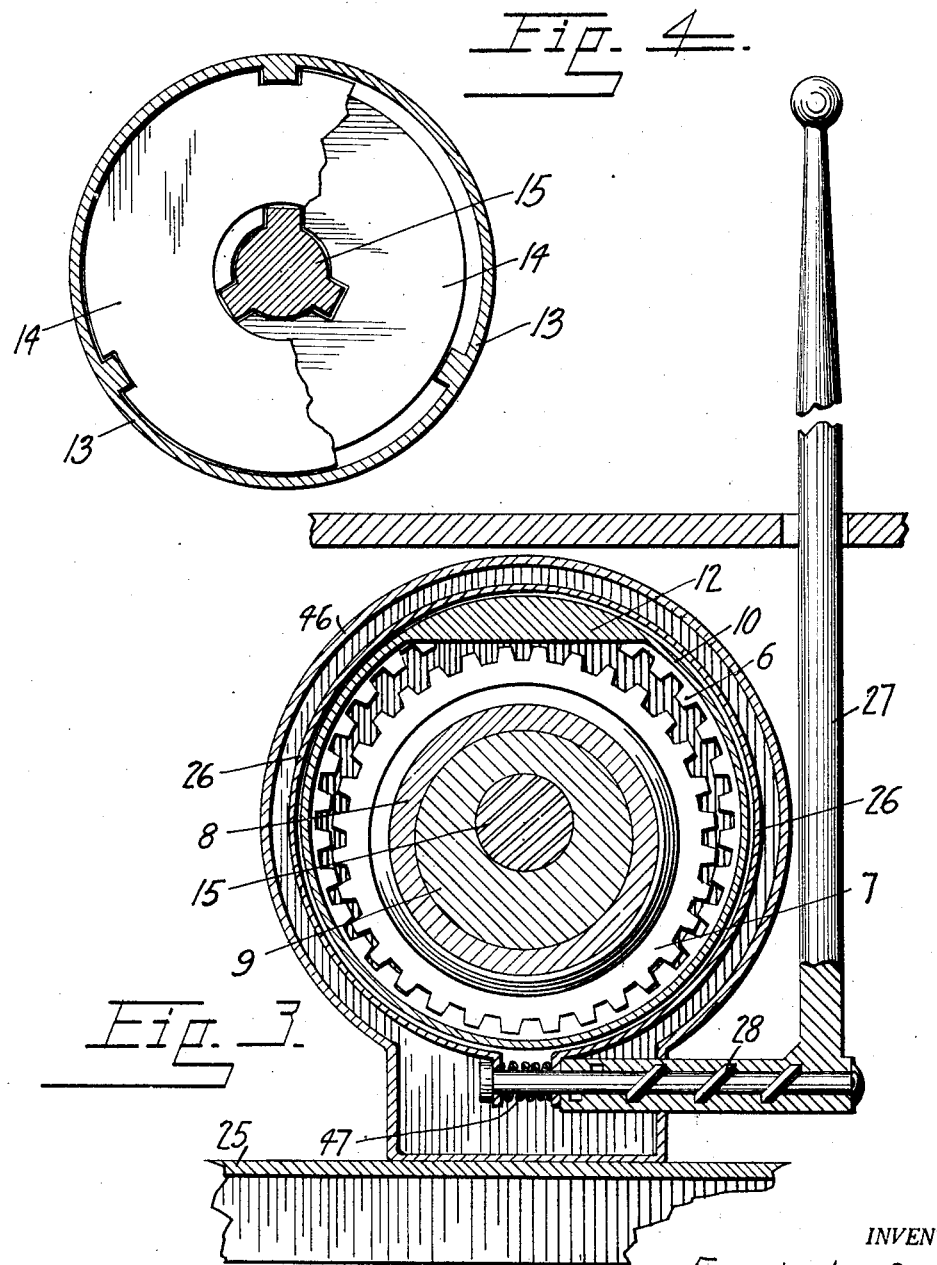
INVENTOR.
Francis L. Orr
BY
ATTORNEY.

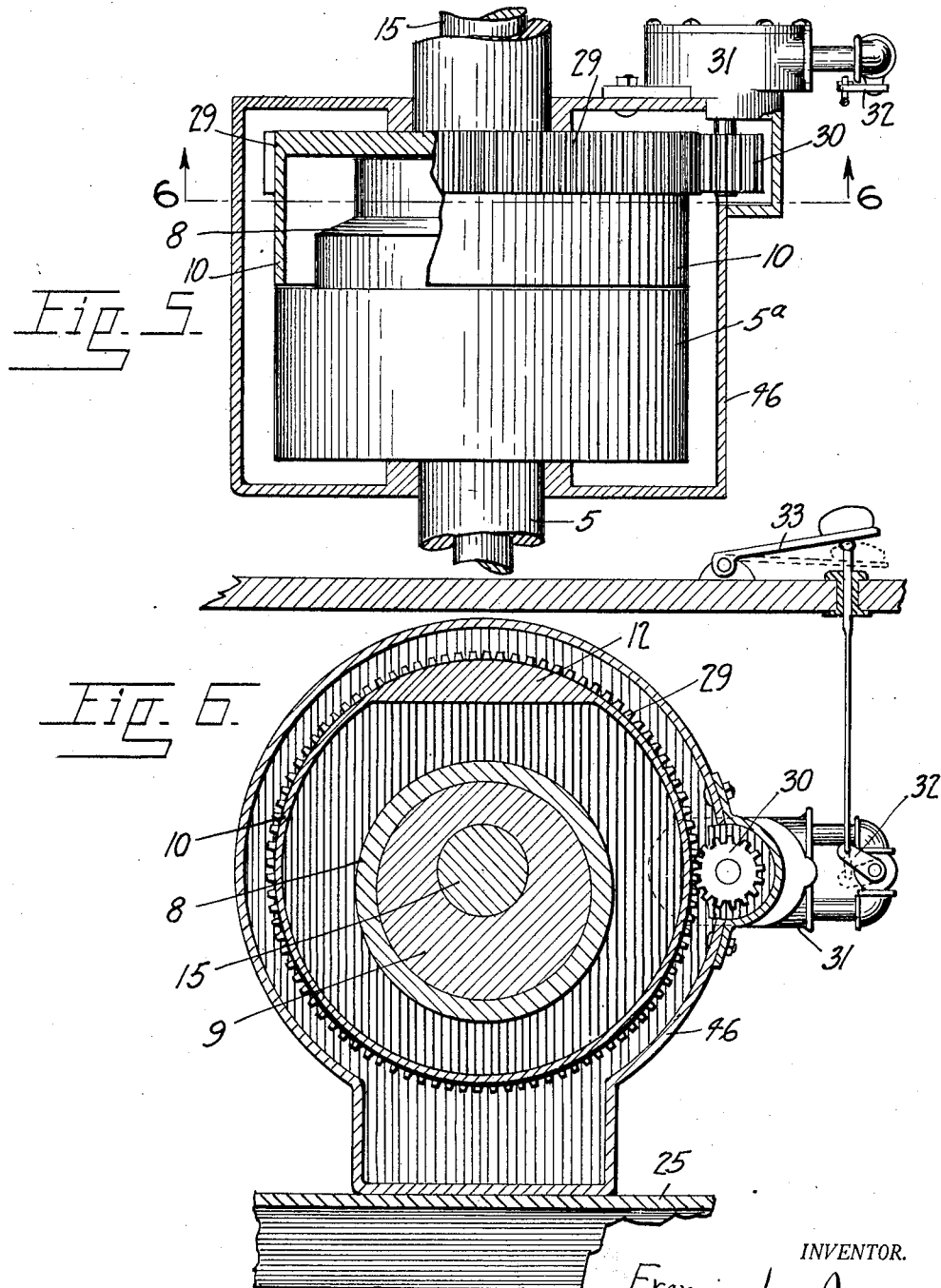

June 4, 1929.　　　　F. L. ORR　　　　1,715,778
VARIABLE SPEED TRANSMISSION
Filed March 26, 1927　　　4 Sheets-Sheet 4
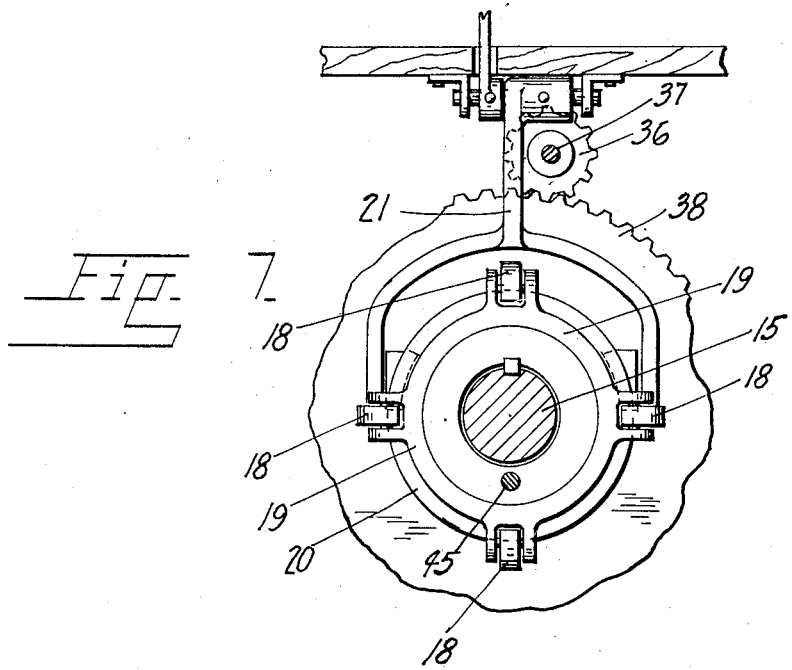
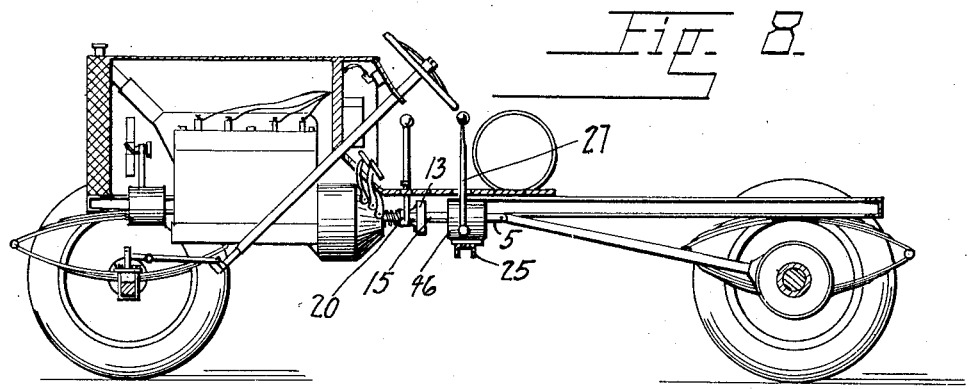
INVENTOR.
Francis L. Orr
BY
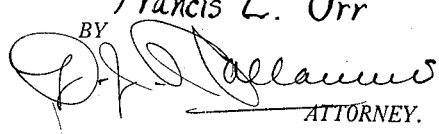
ATTORNEY.

Patented June 4, 1929.

1,715,778

UNITED STATES PATENT OFFICE.

FRANCIS L. ORR, OF DENVER, COLORADO.

VARIABLE-SPEED TRANSMISSION.

Application filed March 26, 1927. Serial No. 178,659.

This invention relates to variable speed transmission and more particularly to improvements in the mechanism shown and described in my application for Patent No. 752,978, filed November 29, 1924.

Its principal object resides in simplifying and otherwise improving the construction, particularly with relation to the means for transmitting the movement of the driving element to the driven element and for varying their relative velocities to any desired degree within predetermined limits.

Another object of the invention resides in providing a means for reversing the direction of rotation of the driven element.

The invention is particularly adapted for use on motor driven vehicles and in this relation has been illustrated in the accompanying drawings.

Figure 1:
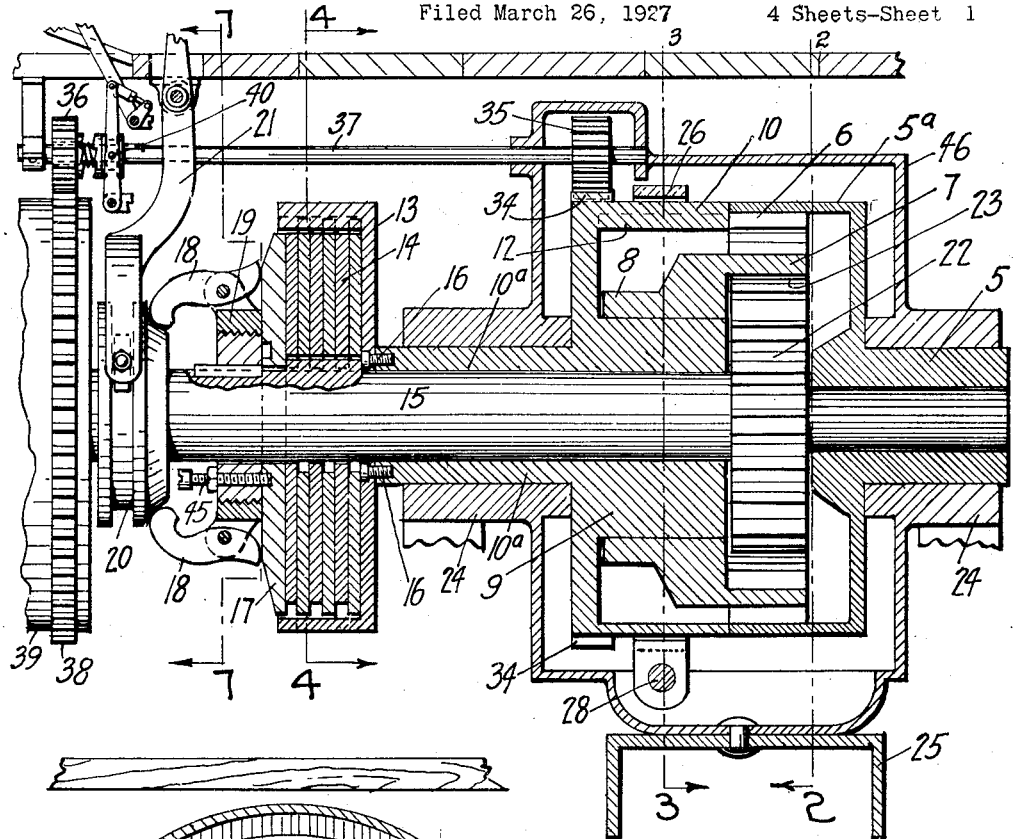
Figure 2:
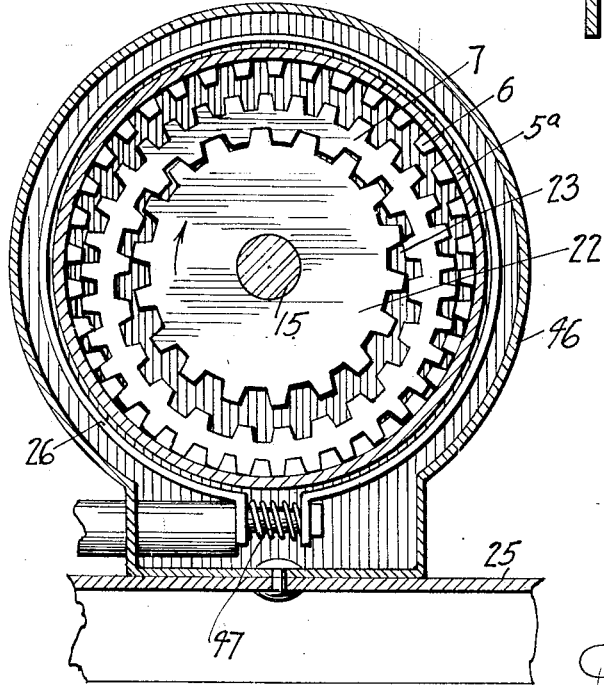

Figure 1 is a sectional elevation of the mechanism,

Figure 2, a section on the line 2—2 Figure 1,

Figure 3, a section on the line 3—3 Figure 1,

Figure 4, a section on the line 4—4 Figure 1,

Figure 5, a sectional plan view showing a modification of the speed-controlling means included in the improved construction, Figure 6, a section on the line 6—6, Figure 5, Figure 7, a section on the line 7—7, Figure 1, and Figure 8, an elevation of a chassis of an automobile to which the transmission mechanism is applied.

Referring further to the drawings, the reference numeral 5 designates the driven shaft which in practice is connected with the propeller shaft of the vehicle and which is formed in integral connection with an internal driven gear 6. Meshing with the gear 6 is an annular gear 7 which has a hub 8 for its support on an eccentric bearing 9 which forms part of an annular drum 10.

The drum 10 and a shroud 5ª on the driven shaft 5 are in end to end engagement to provide a casing for the gearing hereinabove described. The drum has a counterweight 12 as shown in Figures 3 and 6 to counter balance its eccentric hub.

A multiple disk clutch is composed of a housing 13 which by means of screws 16 is rigidly connected at the end of a bearing sleeve 10ª on the drum, and a series of friction disks 14 which are disposed within the housing and which are connected alternately with the housing and with the driving shaft 15 by means of keys as illustrated in Figure 4.

An annular plate 17 is held in contact with the disks by dogs 18 pivoted on a collar 19 and bearing on a collar 20 which slides on the driving shaft 15. The collar 20 is connected with a lever 21 for its adjustment to release the clutch so that the drum may rotate independently of the shaft 15 or to produce the rotative continuity of the drum and the shaft by frictional engagement of the disks 14.

The collar 19 is keyed on the shaft 15 and it provides for the adjustment of the dogs 18 by varying its distance from the disks 17 through the medium of adjusting screws 45.

A pinion 22 on the driving shaft meshes with an internal gear 23 of the annular transmission member 7. The drum 10 and the driven shaft 5 are rotatably supported in bearings 24 fixed on the chassis of the vehicle as indicated at 25 and the bearings preferably form part of a casing 46 which encloses the drum as shown in Figure 1.

The brake band 26 encircling the drum 10 is connected with a lever 27 which by means of a coarse screw-thread 28 functions to tighten the band upon the drum to any desired degree. A spring 47 between the ends of the brake band serves to draw the band away from the drum when the lever is released.

A modification of the last described feature of the invention is illustrated in Figures 5 and 6 in which the drum is provided with an external gear wheel 29 which meshes with a pinion 30 on the shaft of an oil pump 31, the valve 32 of which is controlled by a pedal 33.

The oil pump is operated off the drum. When its valve is open there is no resistance to the movement of the drum and by closing the valve this resistance is increased to any desired degree.

For the purpose of reversing the mechanism, the drum is provided with an external gear 34 which by means of pinions 35 and 36 on a shaft 37 is operatively connected with a gear 38 on the fly wheel 39 or other part of the driving shaft 15. A clutch 40 connects the pinion 36 with the shaft 37 whenever it is desired to reverse the movement of the driven shaft with relation to the driving shaft in the operation of the mechanism.

The driving shaft 15 connected with the engine of the automobile rotates the pinion 23 inside the eccentrically mounted annular gear 7.

When the brake band 26 is loose, the driven shaft 25 remains at rest and the drum 10 revolves in the opposite direction from the driving shaft. By retarding the movement of the drum through the instrumentality of the oil pump of the modification shown in Figures 5 and 6 or by adjustment of the brake band 26 shown in Figure 3, the driven shaft is rotated in the same direction with the driving shaft at a velocity varying in accordance with the power applied. The brake band or the oil pump thus provide the means for varying the speed of the driven shaft with relation to that of the driving shaft at any desired ratio.

If the brake is applied with full force so that the drum is stopped, the maximum ratio betwen the driving shaft and the driven shaft is obtained which ratio is determined by the numbers of teeth in the gear wheels. In a 2 to 3 ratio, for example, the pinion 22 has eighteen teeth, the internal gear of the eccentric 7 with which the pinion meshes has twenty-four teeth, the outer gear on the eccentric 7 meshing with the internal gear 7 of the internal driven shaft, has thirty teeth and the internal gear wheel 6 has thirty-six teeth.

It is to be understood that during the entire operation, the clutch 13 is loose so that the drum 10 can move independently of the driving shaft 15. When the clutch is tightened to effect the rotative continuity of the drum 10 and the shaft 15, the entire mechanism will turn as one unit and the driving shaft and driven shaft will in consequence rotate at equal speeds. If it is desired to reverse the movement of the driving shaft relative to that of the driven shaft the clutch 40 is moved to connect the pinion 36 with the shaft 37.

Having thus described my invention, what I claim and desire to secure by Letters Patent is:—

1. In variable speed transmission, the combination of a driven shaft provided with a housing section having an internal gear, a driving shaft provided with a pinion, a rotary element forming a housing section and arranged in abutting relation with the said housing section to form a gear housing, an annular transmission gear member arranged within the gear housing and mounted for eccentric rotation on the said element and meshing with the pinion and the internal gear of the said shafts, and means for controlling the rotation of the said element to vary the speed of the driven shaft.

2. In variable speed transmission, the combination of a driven shaft having a gear, a driving shaft provided with a pinion, a drum mounted on the driving shaft and having an eccentric hub located within the drum, an annular transmission gear member mounted for rotation on the eccentric hub and meshing with the pinion and the gear of the said shafts, and means for controlling the rotation of the said element to vary the speed of the driven shaft.

3. In a variable speed transmission, the combination of a driven shaft provided with an internal gear, a driving shaft having a pinion, a drum mounted on the driving shaft and having an eccentric hub located within the drum, said drum being also provided with a counterweight also located within the drum, an annular transmission gear member mounted for rotation on the eccentric hub and meshing with the pinion and the gear of the said shafts, and means for controlling the rotation of the drum.

4. In a variable speed transmission, the combination of a driven shaft provided with an internal gear, a driving shaft having a pinion, a drum mounted on the driving shaft and having an eccentric hub located within the drum, said drum being also provided with a counterweight also located within the drum, an annular transmission gear member mounted for rotation on the eccentric hub and meshing with the pinion and the gear of the said shafts, and means for reversing the rotation of the driven shaft.

5. In a variable speed transmission, the combination of a driven shaft provided with an internal gear, a driving shaft having a pinion, a drum mounted on the driving shaft and having an eccentric hub, said drum being also provided with a counterweight, an annular transmission gear member mounted for rotation on the eccentric hub and meshing with the pinion and the gear of the said shafts, an internal gear mounted on the drum, and gearing connecting the external gear of the drum with the drive shaft for reversing the rotation of the driven shaft.

6. In variable speed transmission, the combination of a driven shaft provided with an internal gear, a driving shaft having a pinion, a drum mounted on the driving shaft and having an eccentric hub, said drum being also provided with a counterweight, an annular transmission gear member mounted for rotation on the eccentric hub and meshing with the pinion and the gear of the said shafts, an external gear mounted on the drive shaft, and a shaft having pinions meshing with the external gear of the drum and the drive shaft for reversing the rotation of the driven shaft.

7. In variable speed transmission, the combination of a driven shaft having a gear, a driving shaft having a pinion, a rotary element having a bearing sleeve arranged on the driving shaft, said rotary drum being provided with an eccentric hub located within the drum, an annular transmission gear member mounted on the eccentric hub and meshing with the gear and the pinion of the said shafts, a friction clutch connected with the bearing sleeve and with the driving shaft, operating means for the friction clutch, and a brake member engaging the rotary drum for controlling the rotation thereof.

8. In variable speed transmission, the combination of a driven shaft provided with a housing section having an internal gear, a driving shaft provided with a pinion, a rotary drum forming a housing section and arranged in abutting relation with said first named housing section to form a gear housing, said drum having an eccentric hub located within the drum, an annular transmission gear member arranged within the gear housing and mounted on the said eccentric hub for eccentric rotation and meshing with the pinion and the said internal gear, and means for controlling the rotation of the said drum to vary the speed of the driven shaft.

In testimony whereof I have affixed my signature.

FRANCIS L. ORR.